United States Patent Office 3,262,244
Patented July 26, 1966

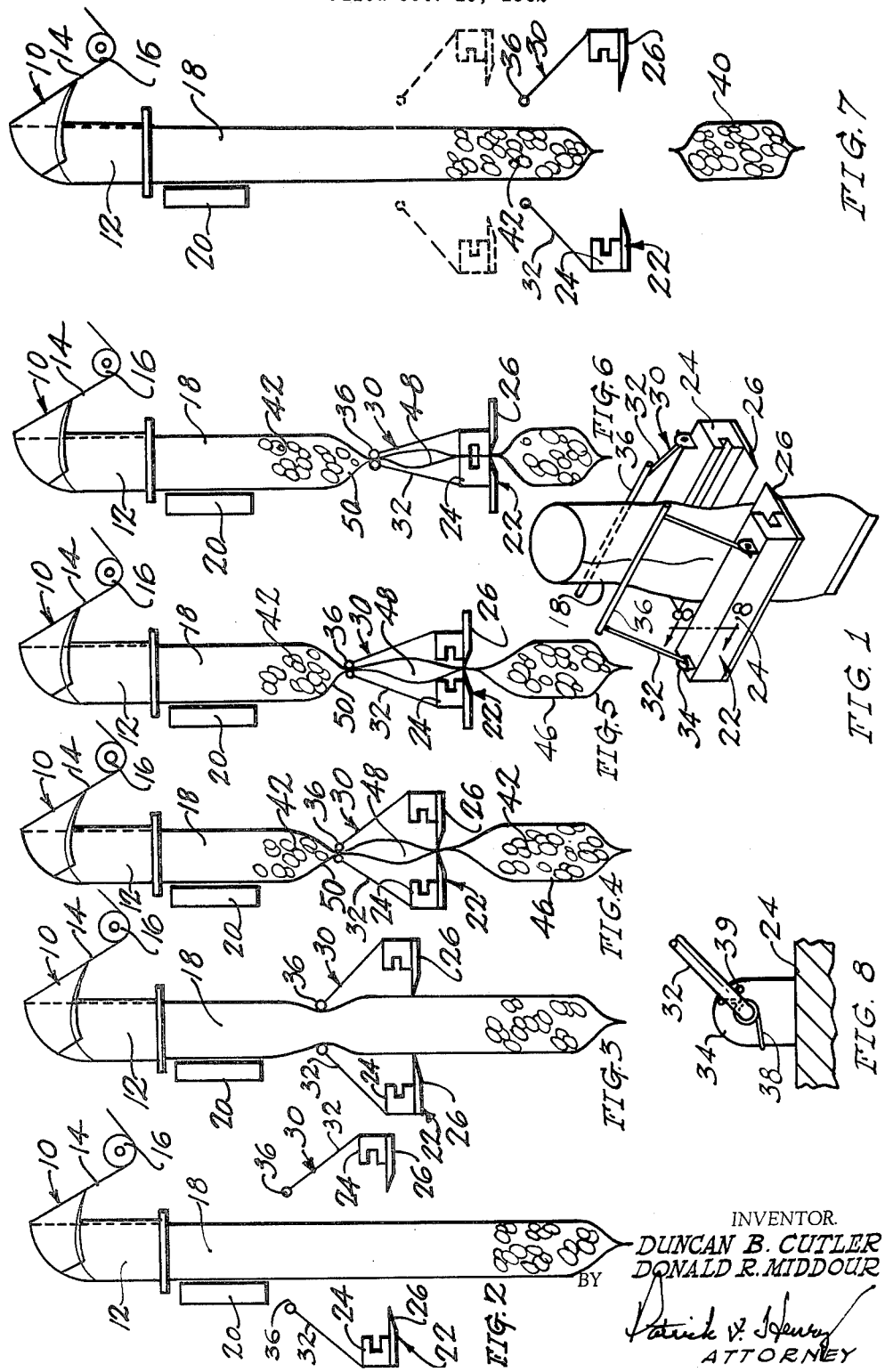

3,262,244
PARTICLE STOPPER APPARATUS FOR FORM AND
FILL MACHINE
Duncan B. Cutler, Chamblee, and Donald R. Middour,
De Kalb County, Ga., assignors to The Woodman Company, Inc., Decatur, Ga., a corporation of Georgia
Filed Oct. 10, 1962, Ser. No. 229,569
2 Claims. (Cl. 53—182)

This invention relates to a particle stopper method and apparatus for form and fill machines and particularly to the art of continuously filling bags which are formed from a continuous tube of cellophane and through which tube the contents of the lowermost bag is fed.

Form and fill machines are well known in the art and the details and arrangement of the machine per se do not form a part of this invention except as an environment or background for the application of the present method and for the present apparatus which is one way of accomplishing the desired result. The machine shown in the present application is represented diagrammatically and is of the type which has a movable carriage that reciprocates from bottom to top and back again and on the downward motion of the carriage pulls an amount of film equal to the desired bag length, at the same time sealing and severing a completed bag from the subsequent bag by a cam actuated knife assembly. This type of machine is found in Stokes, U.S. 2,257,433. The present method and apparatus may also be used on a form and fill machine of the sort where the sealing dies and related structure remain fixed with respect to the frame of the machine and a mechanism is employed to pull the material or tube upwardly and downwardly to create the bag length and to return the machine to initial position. Such a machine is shown in Leasure, Serial No. 2,899,875. The movable carriage type machine is also shown partly in our co-pending application entitled "Gusset Apparatus for Bag Form and Fill Machine and Method," Serial No. 239,205, by Duncan B. Cutler; William L. Warner and William A. Hadden, filed November 19, 1962.

Generally described, in conjunction in the present embodiment with the form and fill machine having a movable carriage of the sort set forth in Stokes, U.S. 2,257,433 and our previously mentioned co-pending application, but without restriction on the scope or use of our invention or method on the type of machine previously mentioned in connection with Leasure, a conventional form and fill machine employs a machine frame having means for delivering a continuous web of glassine, cellophane, plastic material or the like and to draw same over a forming collar where it is formed into a cylinder, the overlapping edges of which are sealed by a heat sealing bar. The cylinder extends through a reciprocating carriage and heat sealing dies close on the film in conjunction with the downward motion of a carriage which pulls an amount of film equal to the desired bag length at the same time sealing and severing the completed bags from the subsequent bag by a cam actuated knife assembly. As the carriage moves back to initial position, the sealing jaws are open. Starting with the severing of the completed bag, the continuous tube of material is sealed at the bottom which represents the bottom of the next bag and which was sealed by the sealing of the top of the bag already cut and removed. Material, such as potato chips or the like, is fed down through the tube and falls to the bottom assisted by whatever means the machine may provide in the form of shaking or blowing or otherwise. When the contents have reached the lowermost bag the sealing jaws start to close and in some instances so-called stripper plates also close on the tube for the purpose of squeezing and stripping the particles away from the sealing area and down into the bag. Because of the high speed operation and the inherent nature of the machine it is necessary to start feeding the material into the bag bottom at the time the sealing jaws cut and move away and it is therefore possible that some of the particles will fall into the area between the closed stripper plates or jaws and create a defective seal. The present invention contemplates spring loaded fingers or the like which are mounted on the top of the sealing jaws and which are spring biased to an inwardly position of inclination whereby immediately preceding the feeding of the next subsequent charge of material from the one already in the lower bag which has not been severed the crumb-stoppers, as we prefer to call them, engage the tube above the bag being sealed and severed and below the bottom of the next subsequent bag and squeeze the tube tightly, maintaining the pressure in the manner of fingers squeezing the tube together and gradually being moved upwardly against their own spring biased pressure as the jaws close and the cutting knife cuts away the lowermost bag. In this manner particles and crumbs are kept clear of the sealing area and practically eliminates the chance for a small particle to cause a defective seal such as a small air hole or other objectionable impediment.

A primary object of this invention is to provide a method for preventing stray and unwanted particles and crumbs from prematurely dropping into the seal area while the top seal is being formed on the lowermost bag and the bottom of the next successive bag.

A further object of this invention is to provide an apparatus in the form of particle stopping fingers which close upon the tube at an appropriate time governed by the motion of the jaws to pinch and squeeze the tube together in an area above the sealing area temporarily and sufficiently for the seal to be completed.

Still another object of this invention resides in the apparatus previously described in the above paragraph and including spring biased means for providing spring pressure to the fingers and for allowing the fingers to be moved as the sealing jaws close on the bags to shift the fingers upwardly in a squeezing action.

Other and further objects and advantages of our invention will become apparent upon reading the following specification taken in conjunction with the accompanying drawings, in which:

FIG. 1 is a perspective view of a typical pair of heat sealing jaws and stripper fingers having the novel particle stoppers of the present invention mounted thereon.

FIG. 2 is the first in a sequence of diagrams illustrating a typical form and fill machine having the apparatus of FIG. 1 mounted thereon and employing the method of the present invention and representing the initial starting position.

FIG. 3 is a diagram similar to FIG. 2 and illustrating the changed position of the jaws and particle stopping members.

FIG. 4 is a diagram similar to FIGS. 1 and 3 with the particle stopping members moved to closed position against the tube and with the stripper plates engaged therebelow.

FIG. 5 is a diagram similar to FIG. 4 with the stripper plates moved downwardly to strip the bag and with the particle stoppers moved upwardly against spring tension.

FIG. 6 is a diagram similar to FIG. 5 with the heat sealing jaws closed and the particle stoppers moved to ultimate position.

FIG. 7 is a diagrammatic view the same as the previous figures illustrating the jaws and particle stoppers having severed the completed bag and snapped open to return through the dotted line position shown to the initial position of FIG. 1.

As mentioned previously, the details of the form and fill machine whether the carriage-movable type or the carriage-stationary type with movable tube is not per se a part of this invention which can be applied to either one and therefore the details of these machines will not be discussed. However, a typical machine 10 employs a former 12 receiving a continuous sheet of glassine or cellophane 14 delivered across a tension roller 16 to be formed into a continuous tube 18 sealed by a sealing means 20 mounted on the machine.

Mounted on the same machine base or frame as the former 12 is a carriage 22 having opposed, heat-sealing jaws 24 mounted thereon and having stripper-plates 26 mounted therewith adapted to engage and strip a bag created from the continuous tube 18.

Jaws 24 have mounted thereon the novel particle stoppers 30 of the present invention each of which comprises a pair of opposed arm members 32 with the lower ends thereof pivotally mounted in a pair of upstanding support flanges 34 on the top of respective jaws 24 and said arms 32 having the other ends thereof attached to a crossbar or particle stopping finger 36 which is a rod or bar member that can be covered with any suitable material such as rubber or plastic or not covered as desired. Spring members 38 are interposed between the arms 32 and the jaws 24 at the flanges 34 to create an inwardly biased and permanently spring tensioned set of particle stoppers 30 which occupy normally the inwardly inclined position which is upwardly and inwardly toward the tube 18 from each of the respective jaw members 24 in the manner shown in FIG. 2. With this arrangement, both of the spring-biased particle stoppers 30 and the fingers 36 resist any outward movement by their respective springs 38.

In the operation of the present method and apparatus, from the completed cycle shown in FIG. 7 where a completed bag 40 has been cut, sealed and dropped and the lowermost portion of the tube 18 has already received a charge of potato chips 42 or the like and the jaws 24 are moving upwardly to initial position, the cycle then starts in the position shown in FIG. 2 at which position the jaws 24 have reached their ultimate upward position and the particle stoppers 30 are in their normal inclined and inoperative position with the fingers 36 in their normal disengaged position on opposite sides of the tube 18.

Since the operation of the machine is at extremely high-speed and all of this is taking place with some of the motions simultaneous, the tube 18 in the position shown in FIGS. 2 and 3 is about to receive another charge of potato chips 42 before the lowermost bag 46 has yet been sealed and cut away. Obviously, if the charge of chips 42 were permitted to enter the seal area which is designated approximately at number 48 in FIG. 4, any particles in this seal area would interfere with a good seal between jaws 24. Likewise, while as shown in FIGS. 3 and 4, the stripper plates 26 close on the tube 18 above the contents 42 and the lowermost bag 46, said stripper plates 26 are incapable of stripping particles from above once they have started the stripping action in a downwardly direction and particles can still fall into the seal area 48.

Therefore, as the jaws 24 close with the strippers 26 about to engage the bag as shown in FIG. 3, the particle stoppers 30 have moved into position with arms 36 touching and depressing the opposite sides of the tube 18 and by the time the stripper plates 26 have snapped to engage position in FIG. 4, the particle stoppers 30 above jaws 24 have moved into position with their respective arms 36 engaging and squeezing the tube 18 from opposite sides at a position above the seal area 48 and actually temporarily within the body of the next bag 50 which is to be formed. Momentarily in the position of FIG. 4 the strippers 26 are allowed to come into position and start the stripping action but particles from the above chips 42 are prevented from entering the sealed area 48 until the sealing jaws which are closing in the position of FIG. 5 have snapped together in the position of FIG. 6 at which time the seal is completed. There is no impediment to the closing of the jaws 24 and the operation of the strippers 26 as the opposed particle stoppers 30 are pushed apart and move upwardly on the tube 18 as the jaws 24 close and the strippers 26 strip. The charge of chips 42 entering the bag is not interfered with in any manner whatsoever and is allowed to fall into the tube in a position ready to drop into the bottom in the position of FIG. 7 as the bag 40 is cut away and the jaws 24 snap to an open position to move through the dotted line position in FIG. 7 back to the initial position of FIG. 2 where the cycle starts anew.

Jaws 24 function in the manner well known in the art, such as found in U.S. Patent No. 1,986,422.

The present invention may be employed in form and fill packaging machines of the sort shown and described in U.S. Patents Numbers 2,969,627 and 3,027,695, as well as Number 2,899,875 previously mentioned. The particle stopper members 30 of the present invention are mounted on the jaws such as jaws 13, 16 in No. 3,027,695, in the manner described in this specification. The operation of the particle stoppers 30 is the same as described herein. On either of the above types of machines, the machine discharges the product into the top bag before the seal is completed on the bag at its bottom and the top of the bottom bag already filled. Thus, the present arrangement acts to close the tube of material to prevent the product from reaching the seal area.

Also, while some of the form and fill machines employ strippers of different construction and operation, and optionally use style plates or other means for shaping the bags, exhausting air, etc. the present method and/or apparatus may be used on any combination of these as long as there are sealing jaws that open and close and relative movement between the jaws and packaging material.

While we have shown and described a particular embodiment of the present method and apparatus this is by way of illustration only and does not constitute any sort of limitation since various alterations, substitutions, changes, revisions, omissions, and deviations may be made in the invention shown and described without departing from the scope of the appended claims.

We claim:
1. In an apparatus for stopping particles from entering the seal area in a form and fill packaging machine of the sort wherein a continuous sheet of material is formed into a tube through which the goods such as potato chips are fed in intermittent charges as bags are created from said tube by heat sealing jaws sealing the bottom of a top bag and the top of a bottom, filled bag, and wherein said heat sealing jaws move from opposite sides of the tube to close and form an elongated and flat seal, and wherein relative movement takes place between said tube and said jaws to bring said jaws to a new position on said tube each time a bag is formed therefrom, comprising:
   (a) a pair of particle stopping fingers mounted on said jaws on the top thereof and normally being inclined inwardly beyond the inner face of said jaws whereby said fingers will engage the opposite sides of the tube prior to the engagement by the jaws,
   (b) and spring means normally biasing said fingers inwardly and against which said fingers will move as said jaws close to force said fingers against opposite sides of said tube.

2. In an apparatus for stopping particles from entering the seal area in a form and fill packaging machine of the sort wherein a continuous sheet of material is formed into a tube through which the goods such as potato chips are fed intermittent charges as bags are created from said tube by heat sealing jaws sealing the bottom of a top bag and the top of a bottom, filled bag, and wherein said heat sealing jaws move from opposite sides of the tube to close and form an elongated and flat seal, and wherein relative movement takes place between said tube and said jaws to bring said jaws to a new position on said tube each time a bag is formed therefrom, comprising:
  (a) a pair of particle stopping fingers mounted on said jaws on the top thereof and normally being inclined inwardly beyond the inner face of said jaws whereby said fingers will engage the opposite sides of the tube prior to the engagement by the jaws,
  (b) and resilient means resisting the movement of said fingers thereon resiliently to force said fingers against opposite sides of said tube.

References Cited by the Examiner
UNITED STATES PATENTS

| | | | |
|---|---|---|---|
| 1,353,210 | 9/1920 | Bates | 53—28 XR |
| 2,953,882 | 9/1960 | Tew | 53—182 XR |
| 2,960,808 | 11/1960 | Pike | 53—182 XR |

FRANK E. BAILEY, *Primary Examiner.*

TRAVIS S. McGEHEE, *Examiner.*

A. E. FOURNIER, S. ABEND, *Assistant Examiners.*